United States Patent
Furuya et al.

(10) Patent No.: US 7,205,063 B2
(45) Date of Patent: Apr. 17, 2007

(54) LANTHANUM GALLATE-BASED SINTERED BODY, MANUFACTURING METHOD THEREOF, AND SOLID OXIDE FUEL CELL USING THE SAME AS SOLID ELECTROLYTE

(75) Inventors: Kenji Furuya, Yokohama (JP);
Masaharu Hatano, Yokohama (JP);
Kazunori Fujii, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 456 days.

(21) Appl. No.: 10/464,457

(22) Filed: Jun. 19, 2003

(65) Prior Publication Data

US 2004/0001995 A1    Jan. 1, 2004

(30) Foreign Application Priority Data

Jun. 28, 2002  (JP) ............................ P2002-190338
Mar. 19, 2003  (JP) ............................ P2003-075777

(51) Int. Cl.
  *C04B 35/50*  (2006.01)
  *H01M 4/86*   (2006.01)
  *C01F 17/00*  (2006.01)

(52) U.S. Cl. ........................ 429/45; 423/263; 423/624; 204/291; 429/33; 429/40; 501/152

(58) Field of Classification Search ................ 501/152; 201/421, 424; 252/521.1; 423/263, 594.16, 423/624; 204/291; 429/33, 40, 45
See application file for complete search history.

(56) References Cited

U.S. PATENT DOCUMENTS 5,240,902 A * 8/1993 Nakamura ................... 505/239
5,259,919 A * 11/1993 Nakamura ................... 117/13
6,004,688 A   12/1999 Goodenough et al.
6,090,500 A * 7/2000 Ishihara et al. ............... 429/33
6,337,006 B1 * 1/2002 Fujita et al. .................. 204/421
6,464,953 B1 * 10/2002 Macaudiere et al. ........ 423/263

FOREIGN PATENT DOCUMENTS

EP    1 026 133 A2    8/2000
JP    2000-44340      2/2000

OTHER PUBLICATIONS

"A solid oxide fuel cell based on Sr- and Mg-doped $LaGaO_3$ electrolyte: the role of a rare-earth oxide buffer", Keqin Huang et al., Journal of Alloys and Compounds 303-304 (2000), pp. 454-464.

(Continued)

*Primary Examiner*—Karl Group
(74) *Attorney, Agent, or Firm*—McDermott Will & Emery LLP

(57) ABSTRACT

A lanthanum gallate-based sintered body comprises a base material formed of lanthanum gallate-based oxide, and grains having a $K_2NiF_4$ structure and/or grains having a layered perovskite structure are dispersed into the base material. Consequently, the lanthanum gallate-based sintered body has a high mechanical strength and is excellent in thermal resistance. Further, a SOFC having excellent properties can be obtained by using the lanthanum gallate-based sintered body as the solid electrolyte.

11 Claims, 7 Drawing Sheets

▨ SINGLE CUBIC PHASE REGION
▢ 214+CUBIC REGION
▧ 237+CUBIC REGION
▨ 214+237+CUBIC REGION

OTHER PUBLICATIONS

"Ceramics Zairyo Kyodogaku (Strength and Fracture of Ceramics)", Hideo Awaji, Corona Publishing Co., Ltd., Jan. 11, 2002, ISBN: 4-339-04554-3.

Huang K., et al. Superior Perovskite Oxide-Ion Conductor: Strontium- and Magnesium-Doped $LaGaO_3$ "I, Phase Relationships and Electrical Properties." Journal of the American Ceramic Society, Blackwell Publishing, vol. 81, No. 10, 1998, pp. 2565-2575, XP002156111, ISSN: 0002-7820.

Majewski, Peter., et al. "Phase diagram studies in the systems $La_2O_3$—SrO—MgO—$Ga_2O_3$ at 1350-1400° C. in air with emphasis on Sr and Mg substituted $LaGaO_3$." Journal of Alloys and Compounds, vol. 329, No. 1-2, Nov. 14, 2001, pp. 253-258, XP004309697, ISSN:0925-08388.

Gorelov, V.P., et al. "The effect of doping and processing conditions on properties of $La_{1-x}Sr_xGa_{1-y}Mg_yO_{3-\alpha}$." Journal of the European Ceramic Society, vol. 21, No. 13, Nov. 2001, pp. 2311-2317, XP004303326, ISSN: 0955-2219.

Choi, S.M., et al. "Oxygen ion Conductivity and cell performance of $La_{0.9}Ba_{0.1}Ga_{1-x}Mg_xO_{3-\beta}$ electrolyte." Solid State Ionics, vol. 131, No. 3-4, Jun. 2, 2000, pp. 221-228, XP004210059, ISSN: 0167-2738.

* cited by examiner

FIG. 7

| | LANTHANUM GALLATE-BASED OXIDE | DISPERSED GRAIN | $K_2NiF_4$ PHASE | AREA PERCENT OF $K_2NiF_4$ GRAINS (AREA%) | LENGTH OF $K_2NiF_4$ GRAINS ($\mu m$) | FRACTURE TOUGHNESS VALUE (MPa·m$^{0.5}$) | THERMAL RESISTANCE TEST |
|---|---|---|---|---|---|---|---|
| EX.1 | $La_{0.9}Sr_{0.1}Ga_{0.8}Mg_{0.2}O_{3-\delta}$ | 7mol%$(La_{0.9}Sr_{0.1})_2(Ga_{0.8}Mg_{0.2})O_{4-\delta}$ | WITH | 10.0 | 72 | 1.5 | Y |
| EX.2 | $La_{0.9}Sr_{0.1}Ga_{0.8}Mg_{0.2}O_{3-\delta}$ | 2mol%$(La_{0.9}Sr_{0.1})_2(Ga_{0.8}Mg_{0.2})O_{4-\delta}$ | WITH | 2.0 | 18 | 1.0 | Y |
| EX.3 | $La_{0.9}Sr_{0.1}Ga_{0.8}Mg_{0.2}O_{3-\delta}$ | 9mol%$(La_{0.9}Sr_{0.1})_2(Ga_{0.8}Mg_{0.2})O_{4-\delta}$ | WITH | 13.0 | 94 | 1.6 | Y |
| EX.4 | $La_{0.9}Sr_{0.1}Ga_{0.8}Mg_{0.2}O_{3-\delta}$ | 13mol%$(La_{0.9}Sr_{0.1})_2(Ga_{0.8}Mg_{0.2})O_{4-\delta}$ | WITH | 18.4 | 102 | 1.5 | Y |
| EX.5 | $La_{0.9}Sr_{0.1}Ga_{0.8}Mg_{0.2}O_{3-\delta}$ | 20mol%$(La_{0.9}Sr_{0.1})_2(Ga_{0.8}Mg_{0.2})O_{4-\delta}$ | WITH | 29.5 | 128 | 1.0 | Y |
| EX.6 | $La_{0.9}Sr_{0.1}Ga_{0.8}Mg_{0.2}O_{3-\delta}$ | 7mol%$(La_{0.9}Sr_{0.1})_2(Ga_{0.8}Mg_{0.2})O_{4-\delta}$ | WITH | 8.9 | 31 | 1.2 | Y |
| EX.7 | $La_{0.9}Sr_{0.1}Ga_{0.8}Mg_{0.2}O_{3-\delta}$ | 7mol%$(La_{0.9}Sr_{0.1})_2(Ga_{0.8}Mg_{0.2})O_{4-\delta}$ | WITH | 10.2 | 117 | 1.6 | Y |
| COM.EX.1 | $La_{0.9}Sr_{0.1}Ga_{0.8}Mg_{0.2}O_{3-\delta}$ | NONE | WITHOUT | — | — | 0.9 | N |
| COM.EX.2 | $La_{0.9}Sr_{0.1}Ga_{0.8}Mg_{0.2}O_{3-\delta}$ | 0.1mol% $Al_2O_2$ | WITHOUT | 14.9[1] | 2[1] | 1.4 | N |
| COM.EX.3 | $La_{0.9}Sr_{0.1}Ga_{0.8}Mg_{0.2}O_{3-\delta}$ | 2mass% $Al_2O_3$ | WITHOUT | 14.2[1] | 3[1] | 1.3 | N |
| COM.EX.4 | $La_{0.8}Sr_{0.2}Ga_{0.75}Al_{0.05}Mg_{0.2}O_{3-\delta}$ | NONE | WITHOUT | — | — | 1.3 | N |

1) Area percent and length of $Al_2O_3$ grains are exhibited.

FIG. 8

| | LANTHANUM GALLATE-BASED OXIDE | DISPERSED GRAIN | 237 PHASE | AREA PERCENT OF 237 GRAINS (AREA%) | LENGTH OF 237 GRAINS ($\mu$m) | FRACTURE TOUGHNESS VALUE (MPa·m$^{0.5}$) | THERMAL RESISTANCE TEST |
|---|---|---|---|---|---|---|---|
| EX.8 | La$_{0.9}$Sr$_{0.1}$Ga$_{0.8}$Mg$_{0.2}$O$_{3-\delta}$ | 3mol%(La$_{0.9}$Sr$_{0.1}$)$_2$(Ga$_{0.8}$Mg$_{0.2}$)$_3$O$_{7-\delta}$ | WITH | 11.6 | 22 | 1.2 | Y |
| EX.9 | La$_{0.9}$Sr$_{0.1}$Ga$_{0.8}$Mg$_{0.2}$O$_{3-\delta}$ | 0.5mol%(La$_{0.9}$Sr$_{0.1}$)$_2$(Ga$_{0.8}$Mg$_{0.2}$)$_3$O$_{7-\delta}$ | WITH | 1.1 | 14 | 1.1 | Y |
| EX.10 | La$_{0.9}$Sr$_{0.1}$Ga$_{0.8}$Mg$_{0.2}$O$_{3-\delta}$ | 2mol%(La$_{0.9}$Sr$_{0.1}$)$_2$(Ga$_{0.8}$Mg$_{0.2}$)$_3$O$_{7-\delta}$ | WITH | 7.2 | 17 | 1.2 | Y |
| EX.11 | La$_{0.9}$Sr$_{0.1}$Ga$_{0.8}$Mg$_{0.2}$O$_{3-\delta}$ | 4mol%(La$_{0.9}$Sr$_{0.1}$)$_2$(Ga$_{0.8}$Mg$_{0.2}$)$_3$O$_{7-\delta}$ | WITH | 13.1 | 36 | 1.3 | Y |
| EX.12 | La$_{0.9}$Sr$_{0.1}$Ga$_{0.8}$Mg$_{0.2}$O$_{3-\delta}$ | 5mol%(La$_{0.9}$Sr$_{0.1}$)$_2$(Ga$_{0.8}$Mg$_{0.2}$)$_3$O$_{7-\delta}$ | WITH | 14.8 | 48 | 1.0 | Y |
| EX.13 | La$_{0.9}$Sr$_{0.1}$Ga$_{0.8}$Mg$_{0.2}$O$_{3-\delta}$ | 3mol%(La$_{0.9}$Sr$_{0.1}$)$_2$(Ga$_{0.8}$Mg$_{0.2}$)$_3$O$_{7-\delta}$ | WITH | 10.7 | 12 | 1.1 | Y |
| EX.14 | La$_{0.9}$Sr$_{0.1}$Ga$_{0.8}$Mg$_{0.2}$O$_{3-\delta}$ | 3mol%(La$_{0.9}$Sr$_{0.1}$)$_2$(Ga$_{0.8}$Mg$_{0.2}$)$_3$O$_{7-\delta}$ | WITH | 10.9 | 48 | 1.3 | Y |
| COM.EX.1 | La$_{0.9}$Sr$_{0.1}$Ga$_{0.8}$Mg$_{0.2}$O$_{3-\delta}$ | NONE | WITHOUT | — | — | 0.9 | N |
| COM.EX.2 | La$_{0.9}$Sr$_{0.1}$Ga$_{0.8}$Mg$_{0.2}$O$_{3-\delta}$ | 0.1mol% Al$_2$O$_2$ | WITHOUT | 14.9[1] | 2[1] | 1.4 | N |
| COM.EX.3 | La$_{0.9}$Sr$_{0.1}$Ga$_{0.8}$Mg$_{0.2}$O$_{3-\delta}$ | 2mass% Al$_2$O$_3$ | WITHOUT | 14.2[1] | 3[1] | 1.3 | N |
| COM.EX.4 | La$_{0.8}$Sr$_{0.2}$Ga$_{0.75}$Al$_{0.05}$Mg$_{0.2}$O$_{3-\delta}$ | NONE | WITHOUT | — | — | 1.3 | N |

[1] Area percent and length of Al$_2$O$_3$ grains are exhibited.

LANTHANUM GALLATE-BASED SINTERED BODY, MANUFACTURING METHOD THEREOF, AND SOLID OXIDE FUEL CELL USING THE SAME AS SOLID ELECTROLYTE

BACKGROUND OF THE INVENTION

1. Field of the Invention

The present invention relates to a lanthanum gallate-based sintered body and a solid oxide fuel cell using the same as a solid electrolyte. More specifically, the present invention relates to a sintered body containing lanthanum gallate-based oxide that is perovskite-type ceramics as a base material, and to a solid oxide fuel cell using the same as a solid electrolyte.

2. Description of the Related Art

A solid oxide fuel cell (hereinafter, also described as "SOFC") has continued to progress since a solid electrolyte was discovered by Nernst in 1899 and the SOFC was operated by Baur and Preis in 1937.

The SOFC is usually operated at a high temperature of 1000° C. or more, and such a high operation temperature greatly narrows the range of selectable materials for composing the cell. For example, it becomes difficult to use metallic parts for a cell container. Accordingly, a development of solid electrolyte materials having high oxygen-ion conductivity even at a low temperature is desired.

As such solid electrolyte materials, stabilized zirconia, stabilized bismuth, a ceria-based material, perovskite-type ceramics and the like, which use stabilizers such as oxides of alkaline-earth elements (CaO, MgO, $Sc_2O_3$ and the like) and rare-earth oxides ($Y_2O_3$ and the like) are known. Among them, a sintered body containing, as a base material, lanthanum gallate-based oxide as one of perovskite-type ceramics has attracted attention in recent years because this sintered body can have relatively high oxygen-ion conductivity even at a low temperature range.

However, the sintered body containing the lanthanum gallate-based oxide as the base material is low in mechanical strength, and therefore, a sufficient mechanical strength must be ensured by thickening the solid electrolyte. However, the thickening of the solid electrolyte will increase the resistance of the solid electrolyte itself in the SOFC.

Accordingly, an improvement of the mechanical strength of the lanthanum gallate-based oxide has been attempted. For example, there has been disclosed a technology of adding alumina powder ($Al_2O_3$) for the purpose of improving the mechanical strength of the sintered body containing the lanthanum gallate-based oxide as the base material (refer to Japanese Patent Application Laid-open No. 2000-44340).

SUMMARY OF THE INVENTION

However, it still cannot be said that the conventional sintered body containing the lanthanum gallate-based oxide as the base material is satisfactory. The mechanical strength may be able to be improved if the alumina powder is added as disclosed in Japanese Patent Application Laid-open No. 2000-44340. However, because the lanthanum gallate and aluminum react easily with each other, there is a problem in that the mechanical strength and the oxygen-ion conductivity are gradually lowered when performing the sintering and using the SOFC for a long time. Particularly, when adding a material containing aluminum, La(Ga, Al)$O_3$ having a perovskite structure is created by which gallium is substituted for thermally diffused aluminum, and the properties of the sintered body are prone to deterioration. With this, it is difficult for the sintered body to be actually applied to various purposes such as a fuel cell for an automobile.

Specifically, the conventional attempt to improve the mechanical strength of the sintered body containing the lanthanum gallate-based oxide as the base material has brought a new problem of lowering thermal resistance.

In consideration of the foregoing fact, it is an object of the present invention to provide a sintered body containing lanthanum gallate-based oxide as the base material, the sintered body having a high mechanical strength and being excellent in thermal resistance.

The first aspect of the present invention provides a lanthanum gallate-based sintered body, comprising: a base material formed of lanthanum gallate-based oxide, wherein grains having a $K_2NiF_4$ structure and/or grains having a layered perovskite structure are dispersed into the base material.

The second aspect of the present invention provides a method of manufacturing a lanthanum gallate-based sintered body, comprising: prefiring a raw material of the lanthanum gallate-based sintered body at a temperature ranging from 1050° C. to 1200° C. inclusive for a time ranging from 2 hours to 10 hours inclusive; milling the prefired raw material to prepare raw material powder; molding the raw material powder; and sintering the molded raw material powder to separate a phase formed of lanthanum gallate-based oxide and a phase having a $K_2NiF_4$ structure and/or a layered perovskite structure.

The third aspect of the present invention provides a solid oxide fuel cell, comprising: a lanthanum gallate-based sintered body including a base material formed of lanthanum gallate-based oxide, wherein grains having a $K_2NiF_4$ structure and/or grains having a layered perovskite structure are dispersed into the base material.

BRIEF DESCRIPTION OF THE DRAWINGS

The invention will now be described with reference to the accompanying drawings wherein;

FIGS. 7 and 8 show test results of examples of the present invention;

DETAILED DESCRIPTION OF THE PREFERRED EMBODIMENT

Hereinafter, description will be made of embodiments of the present invention with reference to the drawings.

A first aspect of the present invention is a sintered body containing lanthanum gallate-based oxide as a base material, the sintered body being formed by dispersing grains having a $K_2NiF_4$ structure or grains having a layered perovskite structure into the base material. Note that, in the description below, the grains having the $K_2NiF_4$ structure and the grains having the layered perovskite structure (237 phase structure) will also be described as "$K_2NiF_4$ grains" and "237 grains," respectively. Although the $K_2NiF_4$ grains and the 237 grains will be described separately in the following description, the sintered body of the present invention may contain both of the grains. Specifically, into the sintered body of the present invention, only the $K_2NiF_4$ grains may be dispersed, only the 237 grains may be dispersed, or both of the $K_2NiF_4$ grains and the 237 grains may be dispersed. In this application, the "containing $K_2NiF_4$ grains" is a concept that includes both a mode including only the $K_2NiF_4$ grains, and a mode including both of the $K_2NiF_4$ grains and the 237 grains. Moreover, other components may be contained in the sintered body if necessary.

Figure 1:
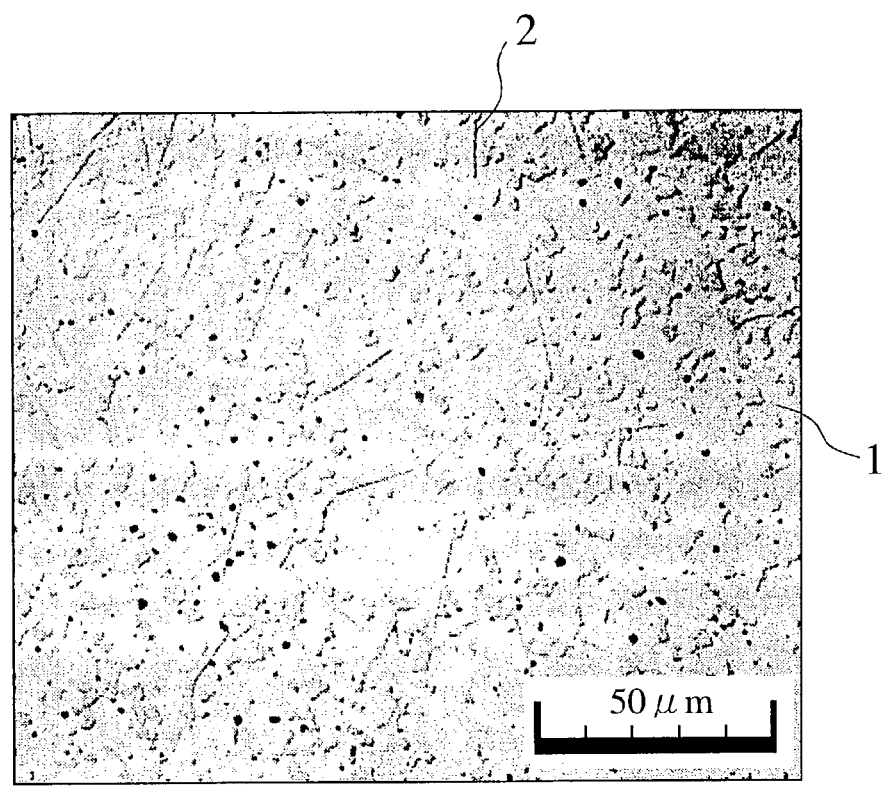
FIG. 1 is a cross-sectional photograph of a sintered body in which $K_2NiF_4$ grains are dispersed into the lanthanum gallate-based oxide.
Figure 2:
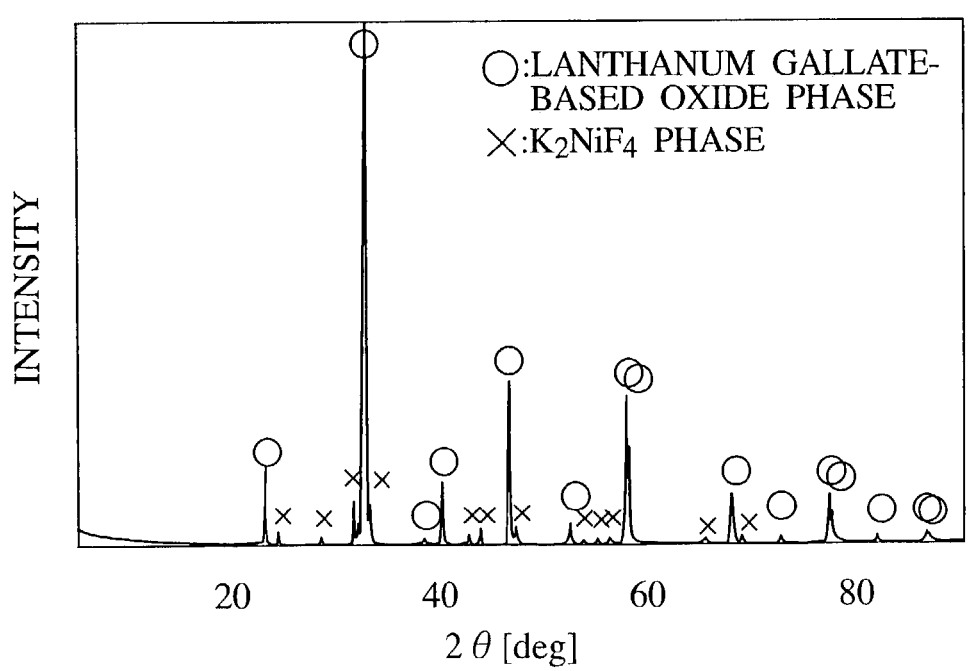
FIG. 2 is a spectrum obtained by an X-ray diffraction analysis concerning powder cut out from the sintered body of FIG. 1.
Figure 3:
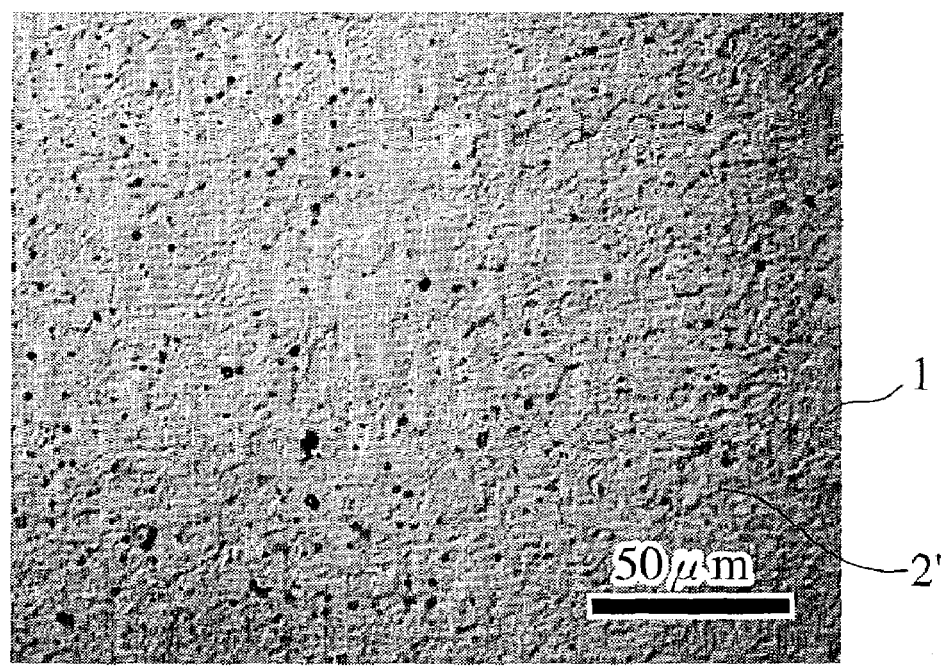
FIG. 3 is a cross-sectional photograph of a sintered body in which 237 grains are dispersed into the lanthanum gallate-based oxide.
Figure 4:
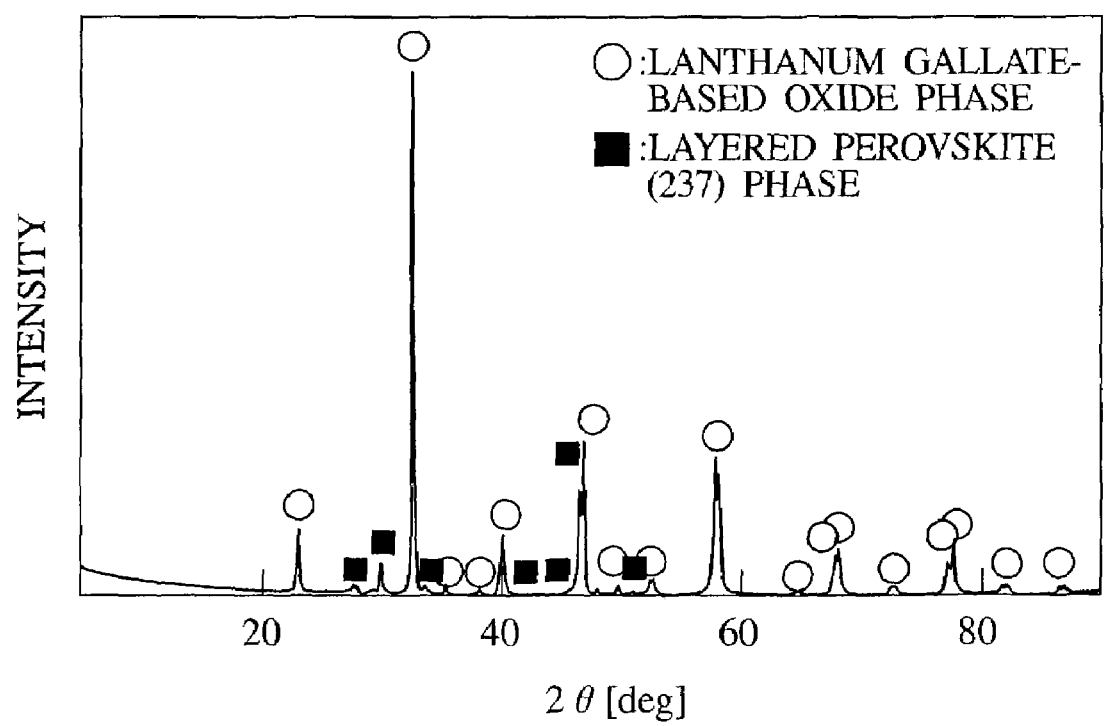
FIG. 4 is a spectrum obtained by an X-ray diffraction analysis concerning powder cut out from the sintered body of FIG. 3.

FIGS. 1 and 3 are optical microscope photographs of cross-sectional surfaces of sintered bodies fabricated by the inventors of the present invention. In the drawings, a reference numeral 1 denotes the lanthanum gallate-based oxide. Moreover, a reference numeral 2 denotes needle-shaped grains having the $K_2NiF_4$ structure, and a reference numeral 2' denotes needle-shaped grains having the layered perovskite structure. When describing the sintered bodies of FIGS. 1 and 3 in more detail, the $K_2NiF_4$ grains 2 or the 237 grains 2', each having a diameter ranging from 0.2 to 4 μm and a length of several tens of micrometers, are uniformly dispersed into the lanthanum gallate-based oxide 1 as the base material. For reference only, spectra obtained by X-ray diffraction analyses (XRD) concerning powder cut out from the sintered bodies are shown in FIGS. 2 and 4. From the spectrum of FIG. 2, it can be confirmed that the sintered body is formed of lanthanum gallate-based oxide phase identified by the ICDD card 87-1609 and $K_2NiF_4$ grain phase identified by the ICDD card 80-1806. This result indicates that each needle-shaped crystal in FIG. 1 is a grain having the $K_2NiF_4$ structure. From the spectrum of FIG. 4, it can be confirmed that the sintered body is formed of the lanthanum gallate-based oxide phase identified by the ICDD card 87-1609 and the 237 grain phase having a composition of $(La_{1-x}A_x)_2(Ga_{1-y}B_y)_3O_{7-\delta}$ identified by the ICDD card 45-0637. This result indicates that each needle-shaped crystal in FIG. 3 is a grain having the layered perovskite structure.

The lanthanum gallate-based oxide as the base material of the sintered body is excellent in oxygen-ion conductivity. Hence, the oxygen-ion conductivity of the sintered body can be ensured by using the lanthanum gallate-based oxide as the base material of the sintered body. The inventors of the present invention explored a dispersion material that imparted a high mechanical strength to the sintered body containing the lanthanum gallate-based oxide as the base material and did not lower various properties thereof such as thermal resistance. As a result, the inventors found out that it was effective to disperse the $K_2NiF_4$ grains or the 237 grains into the sintered body, thus completing the present invention. The sintered body formed by dispersing the $K_2NiF_4$ grains or the 237 grains thereinto has an excellent mechanical strength. Moreover, the $K_2NiF_4$ grains or the 237 grains are stable with the lanthanum gallate, and under high temperature, the $K_2NiF_4$ grains or the 237 grains are not prone to deteriorate the properties of the sintered body.

The respective constituent components of the sintered body as the first aspect of the present invention will be described in detail.

[Lanthanum Gallate-based Oxide]

The lanthanum gallate-based oxide 1 means Ga-based oxide having a perovskite structure, and has a basic composition of $LaGaO_3$. The composition of the lanthanum gallate-based oxide 1 as the base material is not particularly limited as long as it can form the perovskite structure. A part of La and/or Ga may be substituted for other elements such as strontium and magnesium. In consideration of the various properties such as the oxygen-ion conductivity, it is preferable that the lanthanum gallate-based oxide be represented by the following formula (I):

$(La_{1-x}A_x)(Ga_{1-y}B_y)O_{3-\delta}$ (I)

where A is strontium (Sr), barium (Ba) or calcium (Ca), and B is magnesium (Mg) or zinc (Zn). Ranges of x and y are: 0<x<0.2; and 0<y≦0.2, respectively. δ is an oxygen deficit. The oxygen deficit δ is uniquely determined by δ=(x+y)/2 when x and y are determined. Any of A and B may be formed of two or more elements. For example, three elements of strontium, barium and calcium may be used as A. When A and/or B are formed of a plurality of elements, it is satisfactory if the total amount of the elements composing A and/or B may be settled within ranges of predetermined amounts prescribed for x and/or y. As concrete examples of the lanthanum gallate-based oxide, $La_{0.9}Sr_{0.1}Ga_{0.8}Mg_{0.2}O_{3-\delta}$, $(La_{0.9}Sr_{0.1})_{0.9}Ga_{0.8}Mg_{0.2}O_{3-\delta}$ and the like are listed.

[Grain Having $K_2NiF_4$ Structure ($K_2NiF_4$ Grain)]

It is a matter of course that the $K_2NiF_4$ grains are grains having a $K_2NiF_4$ structure. It is preferable that the $K_2NiF_4$ grains for use in the sintered body of the present invention be represented by the following formula (II):

$(La_{1-x}A_x)_2(Ga_{1-y}B_y)O_{4-\delta}$ (II)

where A is strontium (Sr), barium (Ba) or calcium (Ca), and B is magnesium (Mg) or zinc (Zn). Ranges of x and y are: 0<x<0.5; and 0<y≦0.2, respectively. δ is an oxygen deficit. The oxygen deficit δ is uniquely determined by δ=(2x+y-1)/2 when x and y are determined. Any of A and B may be formed of two or more elements. For example, three elements of strontium, barium and calcium may be used as A. When A and/or B are formed of a plurality of elements, it is satisfactory if the total amount of the elements composing A and/or B may be settled within ranges of predetermined amounts prescribed for x and/or y. Moreover, the $K_2NiF_4$ grains represented by the above formula (II) have some oxygen-ion conductivity. Therefore, even if the $K_2NiF_4$ grains are dispersed into the lanthanum gallate-based oxide, the ion conductivity of the sintered body is not lowered so much.

It is preferable that the $K_2NiF_4$ grains have the same constituent elements as those of the lanthanum gallate-based oxide composing the base material. The $K_2NiF_4$ grains formed of the same elements as those of the lanthanum gallate-based oxide are thermodynamically stable with the lanthanum gallate-based oxide. Hence, when the sintered body is subjected to a high-temperature condition, the lowering of the properties can be controlled further.

[Grain Having 237 Structure (237 Grain)]

It is a matter of course that the 237 grains are grains having a 237 structure. It is preferable that the 237 grains for use in the sintered body of the present invention be represented by the following formula (III):

$(La_{1-x}A_x)_2(Ga_{1-y}B_y)_3O_{7-\delta}$ (III)

where A is strontium (Sr), barium (Ba) or calcium (Ca), and B is magnesium (Mg) or zinc (Zn). Ranges of x and y are:

$0 < x < 0.5$; and $0 < y \leq 0.2$, respectively. $\delta$ is an oxygen deficit. The oxygen deficit $\delta$ is uniquely determined by $\delta = (2x + 3y - 1)/2$ when x and y are determined. Any of A and B may be formed of two or more elements. For example, three elements of strontium, barium and calcium may be used as A. When A and/or B are formed of a plurality of elements, it is satisfactory if the total amount of the elements composing A and/or B may be settled within ranges of predetermined amounts prescribed for x and/or y. Moreover, the 237 grains represented by the above formula (III) have some oxygen-ion conductivity. Therefore, even if the 237 grains are dispersed into the lanthanum gallate-based oxide, the ion conductivity of the sintered body is not lowered so much.

It is preferable that the 237 grains have the same constituent elements as those of the lanthanum gallate-based oxide composing the base material. The 237 grains formed of the same elements as those of the lanthanum gallate-based oxide are thermodynamically stable to the lanthanum gallate-based oxide. Hence, when the sintered body is subjected to a high-temperature condition, the lowering of the properties can be controlled further.

Incidentally, in the related art, the toughness of the sintered body has not been examined extensively. However, it is necessary to improve the toughness as well as the mechanical strength for actual usage in an automobile and the like. The inventors of the present invention found out that the toughness of the sintered body was improved effectively when the $K_2NiF_4$ grains or the 237 grains were needle-shaped grains. The reason is assumed that growth of the needle-shaped grains in the base material of the sintered body will bring about a bridging effect, thus preventing cracks from advancing, the cracks occurring in a direction orthogonal to the longitudinal direction of the needle-shaped grains. With regard to the size of the needle-shaped grains that are the $K_2NiF_4$ grains, it is preferable that a length thereof be set in a range from 5 μm to 200 μm inclusive in order to draw a sufficient bridging effect. Moreover, with regard to the size of the needle-shaped grains that are the 237 grains, it is preferable that a length thereof be set in a range from 5 μm to 50 μm inclusive in order to draw a sufficient bridging effect. Note that the length of the needle-shaped grains represents a mean length in the longitudinal direction of the needle-shaped grains. The mean length in the longitudinal direction of the needle-shaped grains can be calculated for the cross-sectional photograph of the sintered body by means of a linear intercept method. When the needle-shaped grains are too short, there is a possibility that the toughness of the bridging effect cannot be sufficiently obtained. On the other hand, when the needle-shaped grains are too long, there is a possibility that the mechanical strength can be lowered. Note that, with regard to the 237 grains, it is difficult to create a needle-shaped grain which exceeds a length of 50 μm. The reason is thought to be due to limitations of the crystal shape and thermodynamic limitations thereof.

Moreover, the SOFC using the solid electrolyte must endure frequent starts and stops (temperature change) when used as a power source of a movable body such as an automobile and as a small-scale distributed generation. Particularly, when a solid electrolyte membrane separating an oxidant and a fuel gas is broken by a thermal shock, there is a risk that the SOFC could explode. Hence, in the case of using the sintered body as the solid electrolyte, it is an extremely important to improve the thermal shock resistance of the sintered body.

As described in "Ceramics Zairyo Kyodogaku (Strength and Fracture of Ceramics)" by Hideo Awaji, published by Corona Publishing Co., Ltd., the thermal shock resistance of the material is evaluated by magnitudes of a thermal shock strength $R_{IC}$ and a thermal shock fracture toughness $R_{IIC}$, which are represented by the following equations:

$$R_{IC} = \frac{\lambda \sigma_C}{E \cdot \alpha}$$

(where $\lambda$ is thermal conductivity, $\sigma_c$ is a tensile strength of the material, E is a Young's modulus, and $\alpha$ is a thermal expansion coefficient)

$$R_{IIC} = \frac{\lambda K_{IC}}{E \cdot \alpha}$$

(where $\lambda$ is thermal conductivity, $K_{IC}$ is a fracture toughness value of the material, E is a Young's modulus, and $\alpha$ is a thermal expansion coefficient)

Specifically, in order to increase the thermal shock strength of the material, it is effective 1) to increase the thermal conductivity, 2) to increase the strength, 3) to reduce the Young's modulus, 4) to reduce the thermal expansion coefficient, and 5) to increase the toughness. When the $K_2NiF_4$ grains or the 237 grains that are the needle-shaped grains are dispersed into the sintered body, the sintered body has a high toughness as described above. Hence, it is possible to improve the thermal shock strength of the material effectively.

Moreover, it is preferable that the area of the $K_2NiF_4$ grains or the 237 grains be within a fixed range when observing the cross-section of the sintered body. With regard to the $K_2NiF_4$ grains, a total area of $K_2NiF_4$ grains of which grain diameter is 0.2 μm or more is set preferably in a range from 2 area % to 30 area % inclusive, and more preferably, in a range from 10 area % to 20 area % inclusive with respect to the area of the cross-section of the sintered body. With regard to the 237 grains, a total area of 237 grains of which grain diameter is 0.2 μm or more is set preferably in a range from 1 area % to 15 area % inclusive, and more preferably, in a range from 8 area % to 13 area % inclusive with respect to the area of the cross-section of the sintered body. While the measurement of such area percents is performed on the cross-section of the sintered body, an orientation on the cross-section of the sintered body is not particularly limited, and the measurement may be performed for an arbitrary cross-section. Moreover, one surface of the sintered body may be ground by diamond grains and the like, and an area percent may be obtained by the ground surface regarded as the cross-section of the sintered body.

When calculating the area percent, first, the cross-section of the sintered body is observed by an optical microscope. A predetermined area for use in the measurement is not particularly limited, and for example, the measurement is performed on an area of 4 mm×4 mm. In the case of the measurement, it is convenient to use a photograph of an image observed by the microscope. Next, the total area of the $K_2NiF_4$ grains or 237 grains observed on the cross-section, of which the diameter is 0.2 μm or more, is calculated by the linear intercept method. Finally, the area percent of the total area calculated by the linear intercept method with respect to the predetermined area is obtained. When the area percent in the sintered body is within the above-described ranges, both the toughness and mechanical strength can be improved effectively. When the area percent is too small, there is a possibility that a sufficient toughness cannot be imparted to the sintered body due to the lack of the $K_2NiF_4$ grains or the 237 grains. On the other hand, when the area percent is too large, there is a possibility that the thermal resistance owing to the $K_2NiF_4$ grains or the 237 grains can be lowered.

The area percent of the dispersed grains of which diameter is 0.2 μm or more can be controlled by firing conditions. Moreover, the control is enabled by adjusting the ratio of materials to be mixed together. Note that the total of a constituent unit of the lanthanum gallate-based oxide and a constituent unit of the $K_2NiF_4$ grains or the 237 grains means a total of the number of a contained constituent unit serving as a base of the lanthanum gallate-based oxide in the sintered body and the number of a contained constituent unit serving as a base of the $K_2NiF_4$ grains or the 237 grains in the sintered body. For example, in the case where the lanthanum gallate-based oxide of 9 moles is contained in the sintered body when $La_{0.9}Sr_{0.1}Ga_{0.8}Mg_{0.2}O_{3-\delta}$ is used as the constituent unit and where the $K_2NiF_4$ grains of 1 mol is contained in the sintered body when $(La_{0.9}Sr_{0.1})_2(Ga_{0.8}Mg_{0.2})O_{4-\delta}$ is used as the constituent unit, the content of the $K_2NiF_n$ grains is 10 mol %. Moreover, in the case where the lanthanum gallate-based oxide of 9 moles is contained in the sintered body when $La_{0.9}Sr_{0.1}Ga_{0.8}Mg_{0.2}O_{3-\delta}$ is used as the constituent unit and where the 237 grains of 1 mol is contained in the sintered body when $(La_{1-x}A_x)_2(Ga_{1-y}B_y)_3O_{7-\delta}$ is used as the constituent unit, the content of the 237 grains is 10 mol %.

A second aspect of the present invention is a manufacturing method of a sintered body, including (1) prefiring a raw material of the sintered body at a temperature ranging from 1050° C. to 1200° C. inclusive for a time ranging from 2 hours to 10 hours inclusive, (2) milling the prefired raw material to prepare raw material powder, (3) molding the raw material powder, and (4) sintering the molded raw material powder to separate a phase formed of lanthanum gallate-based oxide and a phase having a $K_2NiF_4$ structure or a layered perovskite structure. The sintered body according to the present invention can be obtained by such a manufacturing method as described above. Although the manufacturing method of the sintered body of the present invention is not limited to such a reaction sintering method in a solid phase, the above-described method is suitable for effectively crystallizing and depositing the $K_2NiF_4$ grains or the 237 grains into the lanthanum gallate-based oxide. One embodiment of the work process of manufacturing the sintered body will be described below for each step.

(1) Prefiring of Raw Material of Sintered Body

As raw materials of the lanthanum gallate-based oxide serving as the base material, powders of $La_2O_3$, $SrCO_3$, $Ga_2O_3$, $MgO$ and the like are prepared. Predetermined amounts of the raw materials are mixed together, and are then mixed and milled in a solvent such as alcohol by means of a ball mill. Thus, slurry formed of the lanthanum gallate based-oxide is obtained. The amounts of each raw material are determined in accordance with a composition of desired lanthanum gallate-based oxide.

The obtained slurry is dried, and then prefired at a temperature ranging from 1050° C. to 1200° C. inclusive for a time ranging from 2 hours to 10 hours inclusive. When the prefiring temperature is less than 1050° C., there is a possibility that the solid phase reaction becomes insufficient. On the other hand, when the prefiring temperature exceeds 1200° C., the grains to be sintered become nonuniform. When the prefiring time is less than 2 hours, there is the possibility that the solid phase reaction becomes insufficient. On the other hand, when the prefiring time exceeds 10 hours, there is a possibility that grains grow so as to make it impossible to obtain excellent raw material powder. Although an atmosphere for the prefiring is not particularly limited, it is recommended that the prefiring be performed in an atmosphere in consideration of manufacturing cost.

(2) Milling of Prefired Raw Material

The prefired raw material is milled again in alcohol using a ball mill, and thus the raw material powder is obtained. Although the extent of milling is not particularly limited, it is recommended that the milling be performed such that a mean particle diameter is set at 0.8 μm or less. Next, the raw material powder is dried, and thus the powder of lanthanum gallate-based raw material is obtained.

(3) Molding of Raw Material Powder

The raw material powder is filled into a die of a desired shape and molded with pressure. As a pressurizing means, an isostatic press, a hydraulic jack, and the like can be used. It is satisfactory that the pressure to be applied is also determined in consideration of the type, grain diameter and the like of the raw material powder. In general, the material powder is molded with a pressure ranging from 2 to 4 ton/cm².

(4) Sintering of Molded Raw Material Powder

A compact molded by pressurizing the raw material powder is fired, and thus the phase formed of the lanthanum gallate-based oxide and the phase having the $K_2NiF_4$ structure or the layered perovskite structure are separated. A firing temperature ranging from 1350° C. to 1550° C. inclusive is suitable. When the firing temperature is less than 1350° C., there is a possibility that vacancies remain because the sintering is insufficient. On the other hand, when the firing temperature exceeds 1550° C., there is a possibility that the crystallization of the $K_2NiF_4$ phase or 237 phase and the sintering of the phase formed of the lanthanum gallate-based oxide advance too much, thus causing a intercrystalline crack. Moreover, it is preferable to set the sintering time in a range from 10 hours to 100 hours inclusive. When the sintering time is less than 10 hours, there is a possibility that the crystallization of the $K_2NiF_4$ phase or 237 phase existing on the grain boundary does not advance sufficiently, thus making it impossible to improve the toughness significantly. On the other hand, when the sintering time exceeds 100 hours, there is a possibility that the sintering advances too much, thus causing an intercrystalline crack. By the firing process, the grain growth of the separated $K_2NiF_4$ grains or 237 grains advances in a self-assembling manner. It is possible to control the size of the $K_2NiF_4$ grains or 237 grains by adjusting the conditions of the sintering process. When firing, the use of a setter made of a sheet of the same material as the raw material powder and a sagger made of alumina are recommended. A setter made of alumina may also be used. Here, the setter means a stage for mounting the compact thereon in order to prevent a warp when firing in a furnace. The sagger means a container, which is inserted for protecting a sintered material from ash-fall when sintering.

Figure 5:
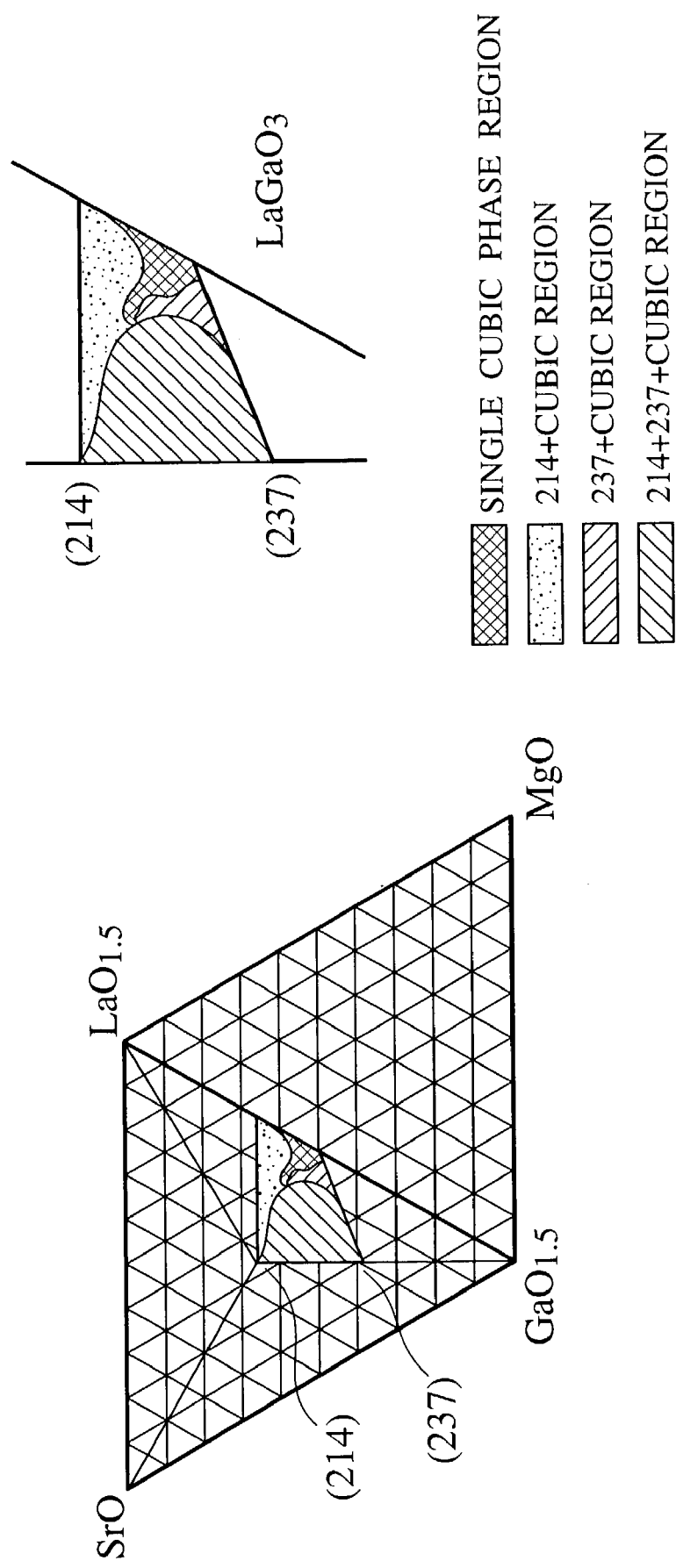
FIG. 5 shows the quaternary La—Sr—Ga—Mg—O phase diagram at 800° C.

For reference only, FIG. 5 shows the quaternary La—Sr—Ga—Mg—O phase diagram at 800° C., which is described in Journal of Alloys and Compounds, 303–304 (2000), 454–464. In this phase diagram, a region is shown, where the perovskite phase, $K_2NiF_4$ phase (214 phase) and layered perovskite phase (237 phase) of the oxygen-ion conductive material coexist. The context of this document explains that the $K_2NiF_4$ phase exists as a glass phase. This $K_2NiF_4$ phase or the layered perovskite phase (237 phase) is crystallized effectively, and thus is compositionally organized with the perovskite phase.

A third aspect of the invention of the application is a solid oxide fuel cell (SOFC) formed by using the above-mentioned sintered body as a solid electrolyte. As mentioned above, the sintered body of the present invention has excellent oxygen-ion conductivity. In addition, the sintered body is also excellent in toughness and mechanical strength. Furthermore, the sintered body has excellent thermal resistance. Therefore, the deterioration of the cell accompanying the use thereof can be controlled significantly. Hence, a SOFC having excellent properties can be obtained by using the sintered body of the present invention as the solid electrolyte. This sintered body can fully cope with the enlargement of the cell. Note that the shape of the sintered body as the solid electrolyte may satisfactorily be molded in accordance with the shape of the cell.

Figure 6:
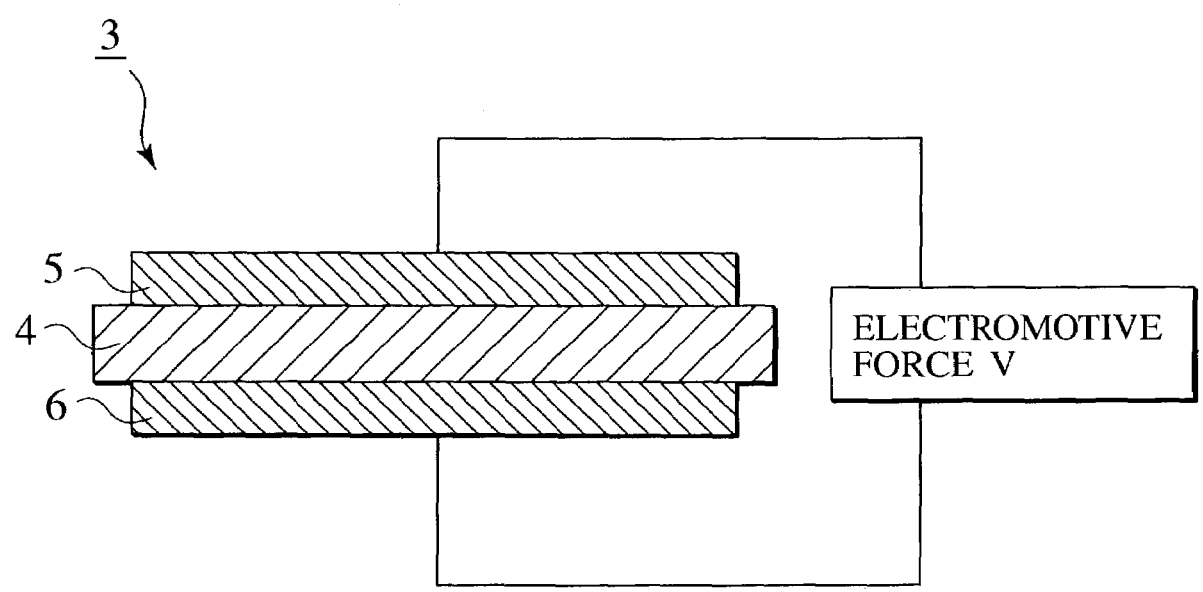
FIG. 6 is a schematic view of a SOFC.

As shown in FIG. 6, the SOFC 3 is formed by which the solid electrolyte 4 formed by using the sintered body of the present invention is sandwiched by the pair of electrodes (cathode 5 and anode 6). The solid electrolyte 4 is heated up to a high temperature ranging from about 500 to 800° C., air is supplied to the cathode 5, and fuel is supplied to the anode 6, thus generating electromotive force. In this case, oxygen ions move from the cathode 5 to the anode 6 through the solid electrolyte 4. In addition, the sintered body of the present invention has high adaptability to the thermal change of an ambient environment. Therefore, even if the sintered body is used as a solid electrolyte in a fuel cell in which temperatures are varied depending on portions, it is possible for the sintered body to exert stable properties.

The effect of the present invention will be described in more detail by the following Examples. However, it is a matter of course that the technical scope of the present invention is not limited to the following Examples. Note that the properties of the obtained sintered body (solid electrolyte) were evaluated by the following methods.

[Evaluation of Sintered Body]

Existence of $K_2NiF_4$ Phase and Layered Perovskite Phase (237 Phase)

The formed sintered body was partially milled, and the existence of the $K_2NiF_4$ phase and layered perovskite phase (237 phase) was confirmed by an XRD method.

Area Percent and Length of $K_2NiF_4$ Grains

The sintered body was ground by diamond grains (0.26 μm), and then the ground surface was observed by an optical microscope. A straight line was drawn randomly on the microscope photograph, and the grain diameters of all the $K_2NiF_4$ grains that crossed this straight line were obtained. A mean diameter thereof was defined as the grain diameter of the $K_2NiF_4$ grains. In addition, an area percent of $K_2NiF_4$ grains of which grain diameter was 0.2 μm or more was calculated by an image analyzer using this mean grain diameter. The length of the $K_2NiF_4$ grains was calculated by extracting the $K_2NiF_4$ grains randomly and averaging the same in a similar manner to the above.

Average Percent and Length of 237 Grains

The sintered body was ground by diamond grains (0.26 μm), and then the ground surface was observed by an optical microscope or a distribution mapping of lanthanum using an electron probe microanalyzer. A straight line was drawn randomly on the microscope photograph, and the grain diameters of all the 237 grains that crossed this straight line were obtained. A mean diameter thereof was defined as the grain diameter of the 237 grains. In addition, an area percent of 237 grains of which grain diameter was 0.2 μm or more was calculated by an image analyzer using this mean grain diameter. The length of the 237 grains was calculated by extracting the 237 grains randomly and averaging the same in a similar manner to the above.

Fracture Toughness Value

The fracture toughness value of the sintered body was measured by means of the Single-Edge-Precracked-Beam method (SEPB method) described in JIS R1607 (ICS 81.060.30).

Thermal Resistance Test

A piece of the sintered body, which was cut into a size of 4.0×3.0×36 mm, was fired at 1100° C., and thus a test piece was obtained. Resistivity of the test piece at 600° C. was measured prior to performing the thermal resistance test. The following equation was used for calculating the resistivity.

$$\text{Resistivity } (\Omega \cdot \text{cm}) = \frac{\text{Voltage (V)} \times \text{Sectional area of test piece (cm}^2\text{)}}{\text{Current (A)} \times \text{Effective length of test piece (cm)}}$$

Next, the test piece was held for 480 hours in a furnace kept at 1000° C. while a current of 100 mA flowed thereto. After 480 hours had elapsed, the resistivity at 600° C. was remeasured using the above equation. A result, in which a resistivity increase rate represented by the following equation was 1% or less, was determined to be good (Y: good; and N: failure in the figures and tables).

$$\text{Resistivity increase rate } (\%) = \frac{\text{Resistivity after endurance test} - \text{Resistivity after endurance test}}{\text{Resistivity before endurance test}} \times 100$$

EXAMPLE 1

First, raw materials ($La_2O_3$, $SrCO_3$, $Ga_2O_3$ and MgO) were weighed such that the dispersion of the $K_2NiF_4$ grains in the base material could be a desired amount. The raw materials were milled and mixed for 24 hours in alcohol using a ball mill, and slurry formed of particles of which mean particle diameter was 2.0 μm or less was obtained. After being dried, the slurry was prefired for 4 hours in an atmosphere of 1150° C.

The prefired raw material powder was milled again in alcohol using a ball mill, and powder of a lanthanum gallate-based raw material formed of particles of which mean particle diameter was 0.6 μm or less was prepared. The prepared powder of the lanthanum gallate-based raw material was filled in a die and molded with pressure of 2 ton/cm² by an isostatic press. The molded compact was fired for 10 hours at 1450° C., and thus a sintered body was obtained.

In the obtained sintered body, $K_2NiF_4$ grains having a composition of $(La_{0.9}Sr_{0.1})_2(Ga_{0.8}Mg_{0.2})O_{4-\delta}$ were dispersed in a ratio of 7 mol % into a phase formed of $La_{0.9}Sr_{0.1}Ga_{0.8}Mg_{0.2}O_{3-\delta}$ that was the base material. The area percent of the $K_2NiF_4$ grains was 10.0 area %. The mean length of the $K_2NiF_4$ grains was 72 μm. The fracture toughness value of the sintered body was 1.5 MPa·m$^{0.5}$. The thermal resistance test was conducted therefor, and the resistance increase rate was 1% or less. Results are shown in FIG. 7.

EXAMPLES 2 TO 5

Sintered bodies were obtained similarly to the method of Example 1 except that the raw materials ($La_2O_3$, $SrCO_3$, $Ga_2O_3$ and MgO) were weighed such that $K_2NiF_4$ grains in amounts shown in FIG. 7 could be deposited. Results are shown in FIG. 7.

EXAMPLE 6

A sintered body was obtained similarly to the method of Example 1 except that the raw materials ($La_2O_3$, $SrCO_3$, $Ga_2O_3$ and MgO) were weighed such that $K_2NiF_4$ grains in an amount shown in FIG. 7 could be deposited and except that the firing time was set at 5 hours. Results are shown in FIG. 7.

EXAMPLE 7

A sintered body was obtained similarly to the method of Example 1 except that the raw materials ($La_2O_3$, $SrCO_3$, $Ga_2O_3$ and MgO) were weighed such that $K_2NiF_4$ grains in an amount shown in FIG. 7 could be deposited and except that the firing time was set at 50 hours. Results are shown in FIG. 7.

COMPARATIVE EXAMPLE 1

The raw materials ($La_2O_3$, $SrCO_3$, $Ga_2O_3$ and MgO) were weighed such that the $K_2NiF_4$ grains and the 237 grains could not be deposited substantially into the base material having the composition of $La_{0.9}Sr_{0.1}Ga_{0.8}Mg_{0.2}O_{3-\delta}$. A sintered body was obtained from these raw materials in a similar procedure to that of Example 1. The $K_2NiF_4$ phase or the 237 phase was not confirmed in the obtained sintered body. Results are shown in FIG. 7.

COMPARATIVE EXAMPLE 2

First, powder of lanthanum gallate-based raw material having the composition of $La_{0.9}Sr_{0.1}Ga_{0.8}Mg_{0.2}O_{3-\delta}$ was obtained in conformity with the method described in Comparative Example 1. $Al_2O_3$ was weighed and added to the above raw material powder such that $Al_2O_3$ of 0.1 mol % could be dispersed thereinto. The powder of lanthanum gallate-based raw material added with $Al_2O_3$ was filled in a die and molded with pressure of 2 ton/cm² by an isostatic press. The molded compact was fired for 10 hours at 1450° C., and thus a sintered body was obtained.

In the obtained sintered body, grains having a composition of $Al_2O_3$ were dispersed into the phase formed of $La_{0.9}Sr_{0.1}Ga_{0.8}Mg_{0.2}O_{3-\delta}$ that was the base material. The $K_2NiF_4$ phase or the 237 phase was not confirmed. The area percent of the $Al_2O_3$ grains was 14.9 area %. The mean length of the $Al_2O_3$ grains was 2 μm. The fracture toughness value of the sintered body was 1.4 MPa·m$^{0.5}$. A thermal resistance test was conducted therefor, and the resistance increase rate exceeded 1%. Results are shown in FIG. 7.

COMPARATIVE EXAMPLE 3

First, powder of lanthanum gallate-based raw material having the composition of $La_{0.9}Sr_{0.1}Ga_{0.8}Mg_{0.2}O_{3-\delta}$ was obtained in conformity with the method described in Comparative Example 1. $Al_2O_3$ was weighed and added to the above raw material powder such that $Al_2O_3$ of 2 mass % could be dispersed thereinto. The powder of lanthanum gallate-based raw material added with $Al_2O_3$ was filled in a die and molded with pressure of 2 ton/cm² by an isostatic press. The molded compact was fired for 10 hours at 1450° C., and thus a sintered body was obtained.

In the obtained sintered body, grains having a composition of $Al_2O_3$ were dispersed into the phase formed of $La_{0.9}Sr_{0.1}Ga_{0.8}Mg_{0.2}O_{3-\delta}$ that was the base material. The $K_2NiF_4$ phase or the 237 phase was not confirmed. The area percent of the $Al_2O_3$ grains was 14.2 area %. The mean length of the $Al_2O_3$ grains was 3 μm. The fracture toughness value of the sintered body was 1.3 MPa·m$^{0.5}$. A thermal resistance test was conducted therefor, and the resistance increase rate exceeded 1%. Results are shown in FIG. 7.

COMPARATIVE EXAMPLE 4

A sintered body was obtained in a similar procedure to that of Example 1 except that powder of lanthanum gallate-based raw material having a composition of $La_{0.8}Sr_{0.2}Ga_{0.75}Al_{0.05}Mg_{0.2}O_{3-\delta}$ obtained by using $La_2O_3$, $SrCO_3$, $Ga_2O_3$, MgO and $Al_2O_3$ was used as the raw material.

The obtained sintered body was formed only of a phase formed of $La_{0.8}Sr_{0.2}Ga_{0.75}Al_{0.05}Mg_{0.2}O_{3-\delta}$. The $K_2NiF_4$ phase or the 237 phase was not confirmed. Results are shown in FIG. 7.

From FIG. 7, it can be confirmed that the toughness was improved by dispersing the $K_2NiF_4$ grains in comparison with the case where the $K_2NiF_4$ grains were not dispersed (Comparative Example 1). In addition, the lowering of the thermal resistance due to the dispersion of the $K_2NiF_4$ grains was not observed in the sintered body of the present invention. This indicates that the $K_2NiF_4$ grains are thermodynamically stable in the base material formed of the lanthanum gallate-based oxide and are effective in toughening the sintered body. In addition, in the cases where an improvement of the toughness was attempted using aluminum (Comparative Examples 2 to 4), it was possible to improve the toughness to a level equivalent to that of the sintered body in the present invention. However, it was confirmed that the thermal resistance was inferior.

EXAMPLE 8

First, raw materials ($La_2O_3$, $SrCO_3$, $Ga_2O_3$ and MgO) were weighed such that the dispersion of the 237 grains in the base material could be a desired amount. The raw materials were milled and mixed for 24 hours in alcohol using a ball mill, and slurry formed of particles of which mean particle diameter was 2.0 μm or less was obtained. After being dried, the slurry was prefired for 4 hours in an atmosphere of 1150° C.

The prefired raw material powder was milled again in alcohol using a ball mill, and powder of a lanthanum gallate-based raw material formed of particles of which mean particle diameter was 0.6 μm or less was prepared. The prepared powder of the lanthanum gallate-based raw material was filled in a die and molded with pressure of 2 ton/cm² by an isostatic press. The molded compact was fired for 10 hours at 1450° C., and thus a sintered body was obtained.

In the obtained sintered body, 237 grains having a composition of $(La_{0.9}Sr_{0.1})_2(Ga_{0.8}Mg_{0.2})_3O_{7-\delta}$ were dispersed in a ratio of 3 mol % into a phase formed of $La_{0.9}Sr_{0.1}Ga_{0.8}Mg_{0.2}O_{3-\delta}$ that was the base material. The area percent of the 237 grains was 11.6 area %. The mean length of the 237 grains was 22 μm. The fracture toughness value of the sintered body was 1.2 MPa·m$^{0.5}$. The thermal resistance test was conducted therefor, and the resistance increase rate was 1% or less. Results are shown in FIG. 8.

EXAMPLES 9 TO 12

Sintered bodies were obtained similarly to the method of Example 8 except that the raw materials ($La_2O_3$, $SrCO_3$, $Ga_2O_3$ and MgO) were weighed such that 237 grains in amounts shown in FIG. 8 could be deposited. Results are shown in FIG. 8.

EXAMPLE 13

A sintered body was obtained similarly to the method of Example 8 except that the raw materials ($La_2O_3$, $SrCO_3$, $Ga_2O_3$ and MgO) were weighed such that 237 grains in an amount shown in FIG. 8 could be deposited and except that the firing time was set at 5 hours. Results are shown in FIG. 8.

EXAMPLE 14

A sintered body was obtained similarly to the method of Example 8 except that the raw materials ($La_2O_3$, $SrCO_3$, $Ga_2O_3$ and MgO) were weighed such that 237 grains in an amount shown in FIG. 8 could be deposited and except that the firing time was set at 50 hours. Results are shown in FIG. 8.

From FIG. 8, it can be confirmed that the toughness was improved by dispersing the 237 grains in comparison with the case where the 237 grains were not dispersed (Comparative Example 1). In addition, the lowering of the thermal resistance due to the dispersion of the 237 grains was not observed in the sintered body of the present invention. This indicates that the 237 grains are thermodynamically stable in the base material formed of the lanthanum gallate-based oxide and are effective in toughening the sintered body. In addition, in the cases where the improvement of the toughness was attempted using aluminum (Comparative Examples 2 to 4), it was possible to improve the toughness to a level equivalent to that of the sintered body in the present invention. However, it was confirmed that the thermal resistance was inferior.

Note that, although the sintered body having $K_2NiF_4$ grains and the sintered body having 237 grains are described separately in the above examples, the sintered body of the present invention may contain both of the $K_2NiF_4$ grains and the 237 grains. It is possible for the sintered body having these mixed grains to obtain the effect of the present invention.

[Investigation of Correlation of Area Percent and Length of $K_2NiF_4$ Grains With Properties of Sintered Body]

A correlation of the area percent and length of the $K_2NiF_4$ grains with the properties of the sintered body was investigated. The manufacturing process of the sintered body conformed to the method of Example 1 except that the amounts of each raw material were adjusted to one in which the area percent of the $K_2NiF_4$ grains was 1.8 area % (Example 15) in the following Table 1. Meanwhile, one in which the area percent of the $K_2NiF_4$ grains was 35.2 area % (Example 16) was prepared in conformity with the method of Example 1 except that the amounts of each raw material were adjusted and the firing time was set at 120 hours. Hence, in any Example shown in Table 1, the lanthanum gallate-based oxides are $La_{0.9}Sr_{0.1}Ga_{0.8}Mg_{0.2}O_{3-\delta}$, and the $K_2NiF_4$ grains are $(La_{0.9}Sr_{0.1})_2(Ga_{0.8}Mg_{0.2})O_{4-\delta}$.

TABLE 1

| | Area percent of $K_2NiF_4$ grain (area %) | Length of $K_2NiF_4$ grain (μm) | Fracture toughness value (MPa·m$^{0.5}$) | Thermal resistance test |
|---|---|---|---|---|
| Example 15 | 1.8 | 2 | 0.9 | Y |
| Example 2 | 2.0 | 18 | 1.0 | Y |
| Example 6 | 8.9 | 31 | 1.2 | Y |
| Example 1 | 10.0 | 72 | 1.5 | Y |
| Example 7 | 10.2 | 117 | 1.6 | Y |
| Example 3 | 13.0 | 94 | 1.6 | Y |
| Example 4 | 18.4 | 102 | 1.5 | Y |
| Example 5 | 29.5 | 128 | 1.0 | Y |
| Example 16 | 35.2 | 215 | 0.8 | Y |

Figure 9:
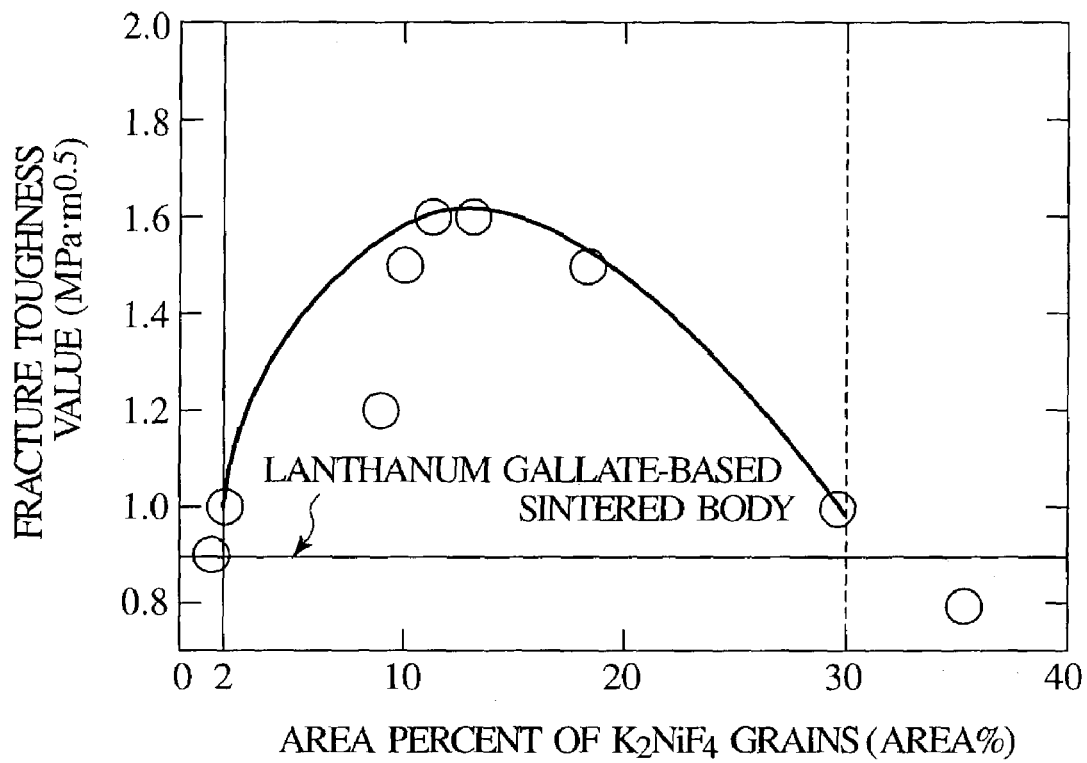
FIG. 9 is a graph showing a relationship between the area percent of the $K_2NiF_4$ grains and the fracture toughness value.

From Table 1, it can be confirmed that the toughness can be enhanced effectively when the mean length of the $K_2NiF_4$ grains ranges from 5 μm to 200 μm inclusive. Moreover, it is indicated that the toughness can be enhanced effectively when the area percent of the $K_2NiF_4$ grains ranges from 2 area % to 30% inclusive, and more preferably, from 10 area % to 20 area % inclusive. Note that a relationship between the area percent of the $K_2NiF_4$ grains and the fracture toughness value is shown in FIG. 9.

[Investigation of Correlation of Area Percent and Length of 237 Grains With Properties of Sintered Body]

A correlation of the area percent and length of the 237 grains with the properties of the sintered body was investigated. The manufacturing process of the sintered body conformed to the method of Example 8 except that the amounts of each raw material were adjusted to one in which the area percent of the 237 grains was 0.6 area % (Example 17) in the following Table 2. Meanwhile, one in which the area percent of the 237 grains was 18.8 area % (Example 18) was prepared in conformity with the method of Example 8 except that the amounts of each raw material were adjusted and the firing time was set at 120 hours. Hence, in any Example shown in Table 2, the lanthanum gallate-based oxides are $La_{0.9}Sr_{0.1}Ga_{0.8}Mg_{0.2}O_{3-\delta}$, and the 237 grains are $(La_{0.9}Sr_{0.1})_2(Ga_{0.8}Mg_{0.2})_3O_{7-\delta}$.

TABLE 2

| | Area percent of 237 grain (area %) | Length of 237 grain (μm) | Fracture toughness value (MPa·m$^{0.5}$) | Thermal resistance test |
|---|---|---|---|---|
| Example 17 | 0.6 | 3 | 0.9 | Y |
| Example 9 | 1.1 | 14 | 1.1 | Y |
| Example 10 | 7.2 | 17 | 1.2 | Y |
| Example 13 | 10.7 | 12 | 1.1 | Y |
| Example 14 | 10.9 | 48 | 1.3 | Y |
| Example 8 | 11.6 | 22 | 1.2 | Y |
| Example 11 | 13.1 | 36 | 1.3 | Y |
| Example 12 | 14.8 | 48 | 1.0 | Y |
| Example 18 | 18.8 | 49 | 0.7 | Y |

Figure 10:
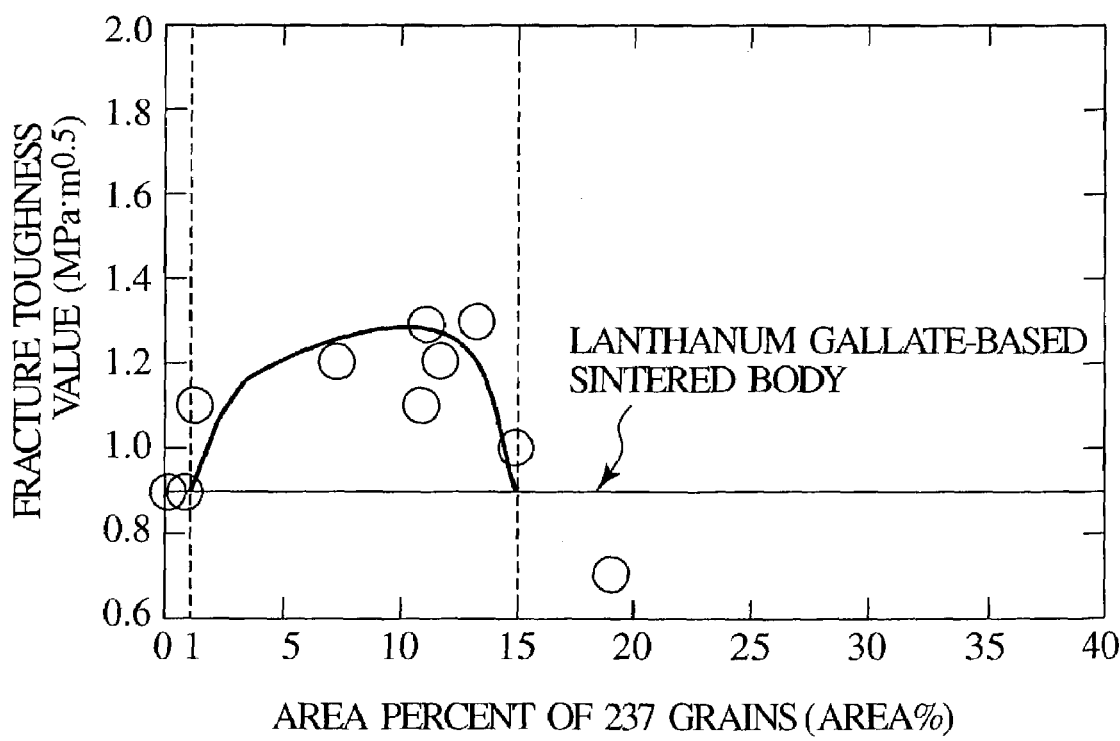
FIG. 10 is a graph showing a relationship between the area percent of the 237 grains and the fracture toughness value.

From Table 2, it can be confirmed that the toughness can be enhanced effectively when the mean length of the 237 grains ranges from 5 μm to 50 μm inclusive. Moreover, it is indicated that the toughness can be enhanced effectively when the area percent of the 237 grains ranges from 1 area % to 15% inclusive, and more preferably, from 8 area % to 13 area % inclusive. Note that a relationship between the area percent of the 237 grains and the fracture toughness value is shown in FIG. 10.

The entire content of Japanese Patent Applications No. P2002-190338 with a filing date of Jun. 28, 2002 and No. P2003-75777 with a filing date of Mar. 19, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A lanthanum gallate-based sintered body, comprising:
a base material formed of lanthanum gallate-based oxide,
wherein grains having a $K_2NiF_4$ structure and/or grains having a layered perovskite structure are dispersed into the base material.

2. A lanthanum gallate-based sintered body according to claim 1,
wherein the lanthanum gallate-based oxide is a compound represented by the following general formula (I):

$$(La_{1-x}A_x)(Ga_{1-y}B_y)O_{3-\delta} \tag{I}$$

where A is any of strontium, barium and calcium, B is any of magnesium and zinc, a range of x is: $0<x<0.2$, and a range of y is: $0<y\leqq0.2$, and $\delta$ is an oxygen deficit.

3. A lanthanum gallate-based sintered body according to claim 1,
wherein the grains having a $K_2NiF_4$ structure are a compound represented by the following general formula (II):

$$(La_{1-x}A_x)_2(Ga_{1-y}B_y)O_{4-\delta} \tag{II}$$

where A is any of strontium, barium and calcium, B is any of magnesium and zinc, a range of x is: $0<x<0.5$, and a range of y is: $0<y\leqq0.2$, and $\delta$ is an oxygen deficit.

4. A lanthanum gallate-based sintered body according to claim 1,
wherein, a length in a longitudinal direction of the grains having the $K_2NiF_4$ structure ranges from 5 μm to 200 μm inclusive, and
a shape of the grains having the $K_2NiF_4$ structure is needle-shaped.

5. A lanthanum gallate-based sintered body according to claim 1,
wherein, on a cross-section of the sintered body, when an area of grains having the $K_2NiF_4$ structure of which grain diameter is 0.2 μm or more is measured by a linear intercept method, the area of grains having the $K_2NiF_4$ structure ranges from 2 area % to 30 area % inclusive with respect to an area of the cross-section.

6. A lanthanum gallate-based sintered body according to claim 1,
wherein the grains having a layered perovskite structure are a compound represented by the following general formula (III):

$$(La_{1-x}A_x)_2(Ga_{1-y}B_y)_3O_{7-\delta} \tag{III}$$

where A is any of strontium, barium and calcium, B is any of magnesium and zinc, a range of x is: $0<x<0.5$, and a range of y is: $0<y\leqq0.2$, and $\delta$ is an oxygen deficit.

7. A lanthanum gallate-based sintered body according to claim 1,
wherein, a length in a longitudinal direction of the grains having the layered perovskite structure ranges from 5 μm to 50 μm inclusive, and
a shape of the grains having the layered perovskite structure is needle-shaped.

8. A lanthanum gallate-based sintered body according to claim 1,
wherein, on a cross-section of the sintered body, when an area of grains having the layered perovskite structure of which grain diameter is 0.2 μm or more is measured by a linear intercept method, the area of grains having the layered perovskite structure ranges from 1 area % to 15 area % inclusive with respect to an area of the cross-section.

9. A method of manufacturing a lanthanum gallate-based sintered body, comprising:
prefiring a raw material of the lanthanum gallate-based sintered body at a temperature ranging from 1050° C. to 1200° C. inclusive for a time ranging from 2 hours to 10 hours inclusive;
milling the prefired raw material to prepare raw material powder;
molding the raw material powder; and
sintering the molded raw material powder to separate a phase formed of lanthanum gallate-based oxide and a phase having a $K_2NiF_4$ structure and/or a layered perovskite structure.

10. The method of manufacturing a lanthanum gallate-based sintered body of claim 9,
wherein conditions of the sintering are a temperature ranging from 1350° C. to 1550° C. inclusive and a time ranging from 10 hours to 100 hours inclusive.

11. A solid fuel cell, comprising:
a lanthanum gallate-based sintered body including a base material formed of lanthanum gallate-based oxide,
wherein grains having a $K_2NiF_4$ structure and/or grains having a layered perovskite structure are dispersed into the base material.

* * * * *